United States Patent [19]
Schienle et al.

[11] Patent Number: 6,028,973
[45] Date of Patent: Feb. 22, 2000

[54] ARRANGEMENT OF TWO INTEGRATED OPTICAL WAVEGUIDES ON THE SURFACE OF A SUBSTRATE

[75] Inventors: Meinrad Schienle; Matthias Heinbach, both of Munich; Bruno Acklin; Gustav Mueller, both of Regensburg, all of Germany

[73] Assignee: Siemens Aktiengesellschaft, Munich, Germany

[21] Appl. No.: 08/934,447

[22] Filed: Sep. 19, 1997

[30] Foreign Application Priority Data

Sep. 20, 1996 [DE] Germany .......................... 196 38 649

[51] Int. Cl.[7] ...................................................... G02B 6/26
[52] U.S. Cl. .................. 385/32; 385/50; 385/39; 385/31
[58] Field of Search .................. 385/31, 32, 43, 385/50, 129–132, 39

[56] References Cited

U.S. PATENT DOCUMENTS

| | | | |
|---|---|---|---|
| 5,438,640 | 8/1995 | Sasaoka et al. | 385/43 |
| 5,799,119 | 8/1998 | Rolland et al. | 385/28 |
| 5,878,070 | 3/1999 | Ho et al. | 385/32 |

FOREIGN PATENT DOCUMENTS

| | | |
|---|---|---|
| 0 285 351 | 10/1988 | European Pat. Off. . |
| 40 30 756 | 9/1990 | Germany . |
| 2219871 | 12/1989 | United Kingdom .................. 385/129 |

OTHER PUBLICATIONS

Smith et al., Reduced Coupling Loss Using a Tapered–Rib Adiabatic–Following Fiber Coupler, IEEE Photonics Technology Letters, vol. 8, No. 8, pp. 1052–1054, Aug. 1996.

Heinbach et al, Low–Loss Bent Connections for Optical Switches, IEEE Journal of Lightwave Technology, vol. 15, No. 5, pp. 833–837, May 1997.

Pennings et al, Simple Method for Estimating Usable Bend Radii of Deeply etched Optical Rib Waveguides, Electronics Letters vol. 27, No. 17, pp. 1532–1534, Aug. 1991.

Ladouceur et al, A New General Approach to Optical Waveguide Path Design, IEEE Journal of Lightwave Technology, vol. 13, No. 3, pp. 481–492, Mar. 1995.

Koai et al, "Modeling of Ti:LiNbO$_3$ Waveguide Devices: Part II—S–Shaped Channel Waveguide Bends", *Journal of Lightwave Technology*, vol. 7, No. 7, Jul. 1989, pp. 1016–1022.

*Primary Examiner*—Rodney Bovernick
*Assistant Examiner*—Juliana K. Kang
*Attorney, Agent, or Firm*—Hill & Simpson

[57] ABSTRACT

An arrangement is composed of at least two waveguides, which are coaxially optically coupled to one another integrated on the surface of the substrate with different degrees of wave guidance. The axis of the more weakly-guiding waveguide is straight and the axis of the more strongly-guiding waveguide comprises a curved section.

19 Claims, 1 Drawing Sheet

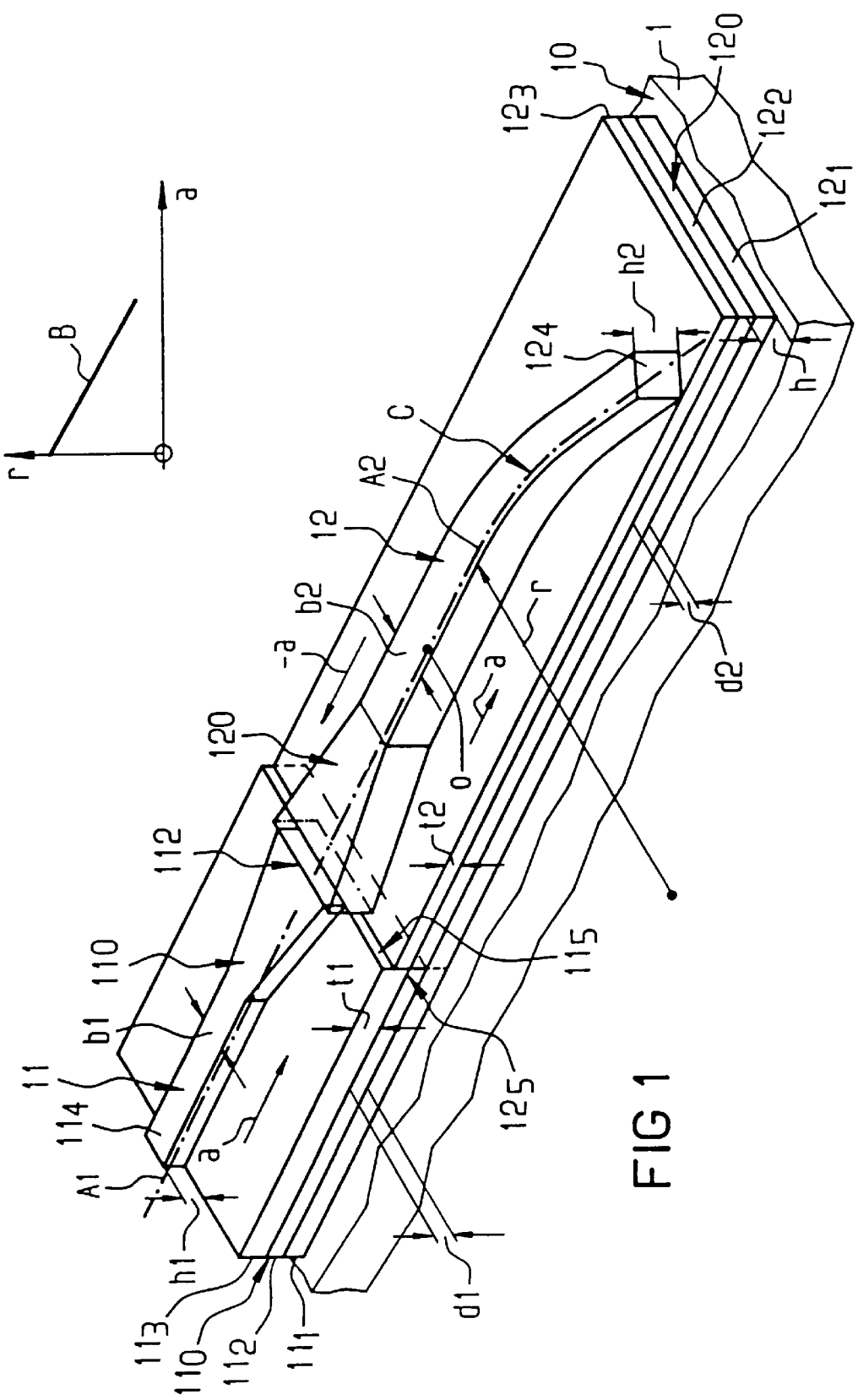

6,028,973

ARRANGEMENT OF TWO INTEGRATED OPTICAL WAVEGUIDES ON THE SURFACE OF A SUBSTRATE

BACKGROUND OF THE INVENTION

The present invention is directed to an arrangement of two optical waveguides which are integrated on the surface of a substrate for the respective guidance of an optical wave along a respective axis.

In integrated-optical circuits, various demands are made of the employed waveguides, dependent on their functions: passive elements like filters or switches are usually based on structures of coupled waveguides that require a weak wave guidance for achieving a compact dimension. A strong wave guidance is needed for curved, connecting waveguides in order to obtain a tight curvature radius due to the occurring emission.

It is possible to employ one waveguide type for all sub-components, whereby the wave guidance is set so that all demands are met to a satisfactory extent. The structures designed according to this compromise are long and narrow. The structural length of the chip is relatively great.

European Application 0 285 351 discloses an arrangement of an optical waveguide integrated on the surface of a substrate that proceeds straight in sections and is curved in other sections. The radiation losses of the waveguide are reduced by trenches arranged at the outside of a curved waveguide.

The article by Koai et al entitled "Modeling of Ti:LiNbO$_3$ Waveguide Devices: Part II—S-Shaped Channel Waveguide Bends" from the *Journal of Lightwave Technology*, Vol. 7, No. 7, July 1989, pp. 1016–1022 discloses how the course of a curve in a curved waveguide can be optimized with respect to radiation losses.

SUMMARY OF THE INVENTION

The present invention is an arrangement of at least two waveguides, which are integrated on the surface of a substrate for a respective guidance of an optical waveguide along a respective axis of each of the waveguides, which has the two waveguides being arranged coaxially following one another and being optically coupled to one another so that a wave guided in the one waveguide couples over into the other waveguide, one of the two waveguides guides the optical wave relatively more weakly and the other waveguide relatively more strongly with the axis of the weakly-guiding waveguide being essentially straight and the axis of the more strongly-guiding waveguide comprising a curvature with a radius of curvature which varies along the axis of this strongly-guiding waveguide.

In the inventive arrangement, both waveguide types, the strongly-guiding and weakly-guiding waveguide types, are realized on a common substrate as in their loss coupling, wherein the advantage of compact dimensions is also established.

Other advantages and features of the invention will be readily apparent from the following description of the preferred embodiments, the drawings and claims.

BRIEF DESCRIPTION OF THE DRAWINGS

FIG. 1 is a schematic perspective illustration of an exemplary embodiment of the inventive arrangement; and FIG. 2 is a diagram showing the exemplary change of the radius of curvature in the direction away from the weakly-guiding waveguide.

DESCRIPTION OF THE PREFERRED EMBODIMENTS

The principles of the present invention are particularly useful when incorporated in an arrangement illustrated in FIG. 1, which arrangement has a waveguide 11 with an axis A1 and a waveguide 12 with an axis A2 which are constructed on a surface 10 of a substrate 1. The two waveguides 11 and 12 are coaxially arranged behind one another and optically coupled to one another so that a wave guided in the waveguide 11 can be coupled into the other waveguide 12 or a light being coupled in the waveguide 12 can be coupled into the waveguide 11.

One of the two waveguides 11 and 12, for example the waveguide 11, guides the optical wave relatively weaker than the other waveguide 12, which, for example, guides the waveguide relatively stronger. The axis A1 of the weakly-guiding waveguide 111 is essentially straight and the axis A2 of the strongly-guiding waveguide 12 comprises a curvature C with a radius of curvature r that changes along this axis A2.

The two waveguides 11 and 12 are generally strip-like waveguides, for example waveguides that exhibit a defined width parallel to the surface of the substrate and perpendicular to the axis within which the optical wave is guided along the axis in the waveguide. A ridge waveguide is an example of a strip-like waveguide.

A ridge waveguide, such as disclosed in German DE 40 30 756, is composed, for example, of a planarly-expanded film waveguide on which a ridge or rib of a predetermined width that extends along the axis is constructed. An optical wave coupled into the film waveguide in the region of the ridge proceeds along the axis of the ridge and remains essentially limited to a narrow region under the ridge defined by the width of the ridge. The axis of the ridge defines the axis of the ridge waveguide along which the optical wave guided therein propagates and the width of the ridge defines the width of the ridge waveguide.

In the example of FIG. 1, both the more weakly-guiding waveguide 11 as well as the more strongly-guiding waveguide 12 are specifically fashioned as ridge waveguides.

In this example, the film waveguide $11_0$ of the more weakly-guiding ridge waveguide 11 is arranged on a planar surface 10 of a substrate and is composed of layers $11_1$, $11_2$ and $11_3$. The ridge $11_4$ of this waveguide 11 is constructed on the uppermost layer $11_3$ of the film waveguide $11_0$ and extends along the straight axis A1.

The film waveguide $12_0$ of the more strongly-guiding ridge waveguide 12 is arranged on the surface 10 of the substrate 1 and is composed of layers $12_1$, $12_2$ and $12_3$. The ridge $12_4$ of this waveguide 12 is fashioned on the uppermost layer $12_3$ of the film waveguide $12_0$ and extends along the axis A2.

The layers $11_1$ and $11_3$ of the film waveguide $11_0$ are cladding layers, and the layer $11_2$ of the film waveguide $11_0$ arranged between these cladding layers $11_1$ and $11_3$ is a core layer that exhibits a higher refractive index or index of refraction as compared to the refractive index of the cladding layers $11_1$ and $11_3$. The optical wave guided in the ridge waveguide along the axis A1 of the ridge is essentially guided in the layer $11_2$.

Likewise, the layers $12_1$, and $12_3$ of the film waveguide $12_0$ are cladding layers. The layer $12_2$ of the film waveguide $12_0$ arranged between these cladding layers $12_1$, and $12_3$ is a core layer that exhibits a higher refractive index or index of refraction as compared to the refractive index of the cladding layers $12_1$, and $12_3$. An optical wave guided in the ridge waveguide 12 along the axis A2 of the ridge $11_4$ is essentially guided in this core layer $12_2$.

When constructed as ridge waveguides, the wave guidance of different strengths of the waveguides 11 and 12 can, for example, be achieved in that the thickness of the core layer and/or then thickness of at least one cladding layer and/or the height of the ridges and/or the refractive index difference between the core and cladding layers of the two waveguides 11 and 12 are selected differently from one another such that:

the thickness d2 of the core layer $12_2$ of the relatively more strongly-guiding ridge waveguide 12 is greater than the thickness d1 of the core layer $11_2$ of the relatively more weakly-guiding ridge waveguide 11 and/or the thickness t2 of the cladding layer $12_1$ and/or $12_3$ of the waveguide 12 is less than the thickness t1 of the cladding layers $11_1$ or, respectively, $11_3$ of the waveguide 11 and/or the height h2 of the ridge $12_4$ of the waveguide 12 is greater than the height h1 of the ridge $11_4$ of the waveguide 11 and/or the refractive index difference between the core layer $12_2$ and the cladding layers $12_1$ and $12_3$ of the waveguide 12 is greater than the refractive index different between the core layer $11_2$ and the cladding layers $11_1$ and $11_3$ of the waveguide 11.

In the example of FIG. 1, it is established that the two film waveguides $11_0$ and $12_0$ of the two waveguides 11 and 12 differ from one another only in the cladding layers $11_3$ and $12_3$ arranged on the respective core layer $11_2$ or $12_2$, so that the thickness t2 of the cladding layer $12_3$ is less than the thickness t1 of the cladding layer $11_3$ and the height h2 of the ridge $12_4$ of the waveguide 12 is greater by a thickness difference t1–t2 than the height h1 of the ridge $11_4$ of the waveguide 11.

Generally, the widths of the waveguides 11 and 12, which are specifically determined by the widths b1 and b2 of the ridges $11_4$ and $12_4$ in the example of FIG. 1 can advantageously be optimally selected independently of one another for their respective function and are, therefore, generally different.

The radius of curvature r of the axis A2 of the more strongly-guiding waveguide 2 preferably changes so that it exhibits a continuous decrease B in a direction of arrow a, which points away from the more weakly-guiding waveguide 11. This decrease B, which is shown in FIG. 2, is largely arbitrary and, for example, linear as well. In FIG. 2, the curvature r is entered dependent on the distance from a point 0 along the axis A2 in the direction of arrow a pointing away from the waveguide 11.

The two waveguides 11 and 12 are preferably optically coupled to one another by butt coupling. For example, the two waveguides comprise end faces $11_5$ and $12_5$ lying directly opposite one another that are centrally arranged relative to one another because of the coaxial arrangement of the two waveguides 11 and 12. The central arrangement has the advantage that manufacturing fluctuations of the width of the waveguides 11 and 12 hardly deteriorate the crossover of a guided wave from one waveguide into the other.

In the example of FIG. 1, the butt coupling is advantageously realized in that the film waveguides $11_0$ and $12_0$ of the two ridge waveguides 11 and 12 are adjoining sections of a single film waveguide allocated in common to the two waveguides 11 and 12, whose core layers extend over both waveguides 11 and 12. The location at which the two sections $11_0$ and $12_0$ adjoin one another is established by a step at which the thicker cladding $11_3$ merges into the thinner cladding $12_3$ and the mark of the end faces $11_5$ and $12_5$ of these sections $11_0$ and $12_0$ lying opposite one another. As a result of the single film waveguide, the end faces $11_5$ and $12_5$ are imaginary end faces that are not really present.

The butt coupling enables a low-loss and polarization-independent crossover of the optical wave from one waveguide into the other waveguide.

It is thereby advantageous when the relatively more strongly-guiding waveguide 12 comprises a taper-shaped section 120 lying opposite a relatively more weakly-guiding waveguide 11, which taper-shaped end section expands in the direction opposite to the arrow a to the more weakly-guiding waveguide 11. In another alternation, when the relatively more weakly-guiding waveguide has a tapered end section lying opposite the more strongly-guiding waveguide, which tapered section 110 expands in a direction of the arrow a toward the more strongly-guiding waveguide 12.

Preferably, the taper-shaped end section 120 of the relatively more strongly-guiding waveguide 12 broadens parallel to the surface 10 of the substrate 1. The taper-shaped end section 110 of the more weakly-guiding waveguide also preferably broadens parallel to the surface 10 of the substrate 1.

In the example of FIG. 1, the waveguide 11 has the taper-shaped end section 110 and the waveguide 12 has the taper-shaped end section 120, which both broaden parallel to the surface 10 of the substrate. These sections are defined by the broader portions of the ridges $11_4$ and $12_4$ of the respective waveguides 11 and 12.

Although various minor modifications may be suggested by those versed in the art, it should be understood that we wish to embody within the scope of the patent granted hereon all such modifications as reasonably and properly come within the scope of our contribution to the art.

We claim:

1. An arrangement of at least two optical waveguides integrated on a surface of a substrate for the respective guidance of an optical wave along a respective axis, said arrangement comprising two waveguides being arranged coaxially following one another and being optically coupled to one another so that a wave guided in one waveguide is coupled over into the other waveguide, one of the two waveguides guides the optical wave relatively more weakly than the other of the two waveguides which other waveguide guides the optical wave relatively more strongly, the axis of the more weakly-guiding waveguide being essentially straight and the axis of the more strongly-guiding waveguide having a curvature with a radius of curvature continuously decreasing along the axis of the waveguide as the distance from the more weakly-guiding waveguide increases.

2. An arrangement according to claim 1, wherein the continuous decrease of the radius of curvature is linear.

3. An arrangement according to claim 1, wherein the two waveguides are coupled to one another by butt coupling.

4. An arrangement according to claim 1, wherein the more strongly-guiding waveguide has a taper-shaped end section lying opposite a relatively more weakly-guiding waveguide, and said taper-shaped end section converges as the distance from the more weakly-guiding waveguide increases.

5. An arrangement according to claim 4, wherein the taper-shaped end section of the more strongly-guiding waveguide broadens parallel to a surface of the substrate.

6. An arrangement according to claim 4, wherein the more weakly-guiding waveguide has a taper-shaped end section lying opposite the taper-shaped end section of the relatively more strongly-guiding waveguide, said taper-shaped end section of the more weakly-guiding waveguide expanding in a direction as the distance to the taper-shaped end section of the more strongly-guiding waveguide decreases.

7. An arrangement according to claim 6, wherein the taper-shaped end section of the more weakly-guiding waveguide broadens parallel to the surface of the substrate.

8. An arrangement according to claim 6, wherein the taper-shaped end section of both the more weakly-guiding waveguide and the strongly-guiding waveguide broaden parallel to the surface of the substrate.

9. An arrangement according to claim 6, wherein the taper-shaped end section of the more strongly-guiding waveguide broadens parallel to the surface of the substrate.

10. An arrangement according to claim 1, wherein both the more strongly-guiding waveguide and weakly-guiding waveguide are ridge waveguides.

11. An arrangement of at least two optical waveguides integrated on a surface of a substrate for the respective guidance of an optical wave along a respective axis, said arrangement comprising two waveguides being arranged coaxially following one another and being optically coupled end-to-end to one another so that a wave guided in one waveguide is coupled over into the other waveguide, one of the two waveguides guides the optical wave relatively more weakly than the other of the two waveguides which other waveguide guides the optical wave relatively more strongly, the axis of the more weakly-guiding waveguide being essentially straight and the axis of the more strongly-guiding waveguide having a curvature with a radius of curvature varying along the axis of the waveguide by continuously decreasing in a direction away from the more weakly-guiding waveguide.

12. An arrangement according to claim 11, wherein the continuous decrease of the radius of curvature is linear.

13. An arrangement according to claim 11, wherein the more strongly-guiding waveguide has a taper-shaped end section lying opposite a relatively more weakly-guiding waveguide, and said taper-shaped end section converges as the distance from the more weakly-guiding waveguide increases.

14. An arrangement according to claim 13, wherein the taper-shaped end section of the more strongly-guiding waveguide broadens parallel to a surface of the substrate.

15. An arrangement according to claim 13, wherein the more weakly-guiding waveguide has a taper-shaped end section lying opposite the taper-shaped end section of the relatively more strongly-guiding waveguide, said taper-shaped end section of the more weakly-guiding waveguide expanding in a direction as the distance to the taper-shaped end section of the more strongly-guiding waveguide decreases.

16. An arrangement according to claim 15, wherein the taper-shaped end section of the more weakly-guiding waveguide broadens parallel to the surface of the substrate.

17. An arrangement according to claim 15, wherein the taper-shaped end section of both the more weakly-guiding waveguide and the strongly-guiding waveguide broaden parallel to the surface of the substrate.

18. An arrangement according to claim 15, wherein the taper-shaped end section of the more strongly-guiding waveguide broadens parallel to the surface of the substrate.

19. An arrangement according to claim 11, wherein both the more strongly-guiding waveguide and weakly-guiding waveguide are ridge waveguides.

* * * * *